(No Model.) 2 Sheets—Sheet 1.

J. LOWMAN.
MACHINERY FOR CUTTING CORKS.

No. 527,865. Patented Oct. 23, 1894.

Witnesses.
B. W. Miller.
Geo. E. Davis

Inventor.
John Lowman,
By his Attorneys,
Baldwin, Davidson & Wight (No Model.) 2 Sheets—Sheet 2.
J. LOWMAN.
MACHINERY FOR CUTTING CORKS.

No. 527,865. Patented Oct. 23, 1894.

Witnesses.
B. W. Miller
Guy E. Davis

Inventor.
John Lowman,
By his Attorneys
Baldwin Davidson Wight

UNITED STATES PATENT OFFICE.

JOHN LOWMAN, OF LONDON, ENGLAND, ASSIGNOR TO PABLO LARIOS, OF GIBRALTAR.

MACHINERY FOR CUTTING CORKS.

SPECIFICATION forming part of Letters Patent No. 527,865, dated October 23, 1894.

Application filed February 27, 1894. Serial No. 501,679. (No model.) Patented in England November 25, 1892, No. 21,564; in Spain January 27, 1893, No. 14,050; in Portugal February 20, 1893, No. 1,758; in France October 14, 1893, No. 233,411, and in Belgium October 17, 1893, No. 106,781.

*To all whom it may concern:*

Be it known that I, JOHN LOWMAN, engineer, a subject of the Queen of Great Britain, residing at 78 Coburg Road, Old Kent Road, London, in the county of Surrey, England, have invented certain new and useful Improvements in Machinery for Cutting Corks, (for which I have received Letters Patent in Great Britain, No. 21,564, dated November 25, 1892; in Spain, No. 14,050, dated January 27, 1893; in Portugal, No. 1,758, dated February 20, 1893; in France No. 233,411, dated October 14, 1893, and in Belgium, No. 106,781, dated October 17, 1893,) of which the following is a specification.

The cork to be operated upon is brought to the machine in the form of bars of rectangular section and by the machine it is fashioned to a circular form suitable to be divided up into corks. This is effected by means of a rapidly rotating cutter having an annular cutting edge and rollers which carry the bars of cork forward along the surface of a table and force it against the cutting edge and through the cutter, which with its spindle is hollow from end to end. The bars being thus reduced approximately to a circular section are afterward cut to suitable lengths.

In order that my invention may be fully understood and readily carried into effect I will proceed to describe the drawings hereunto annexed.

Figure 1:
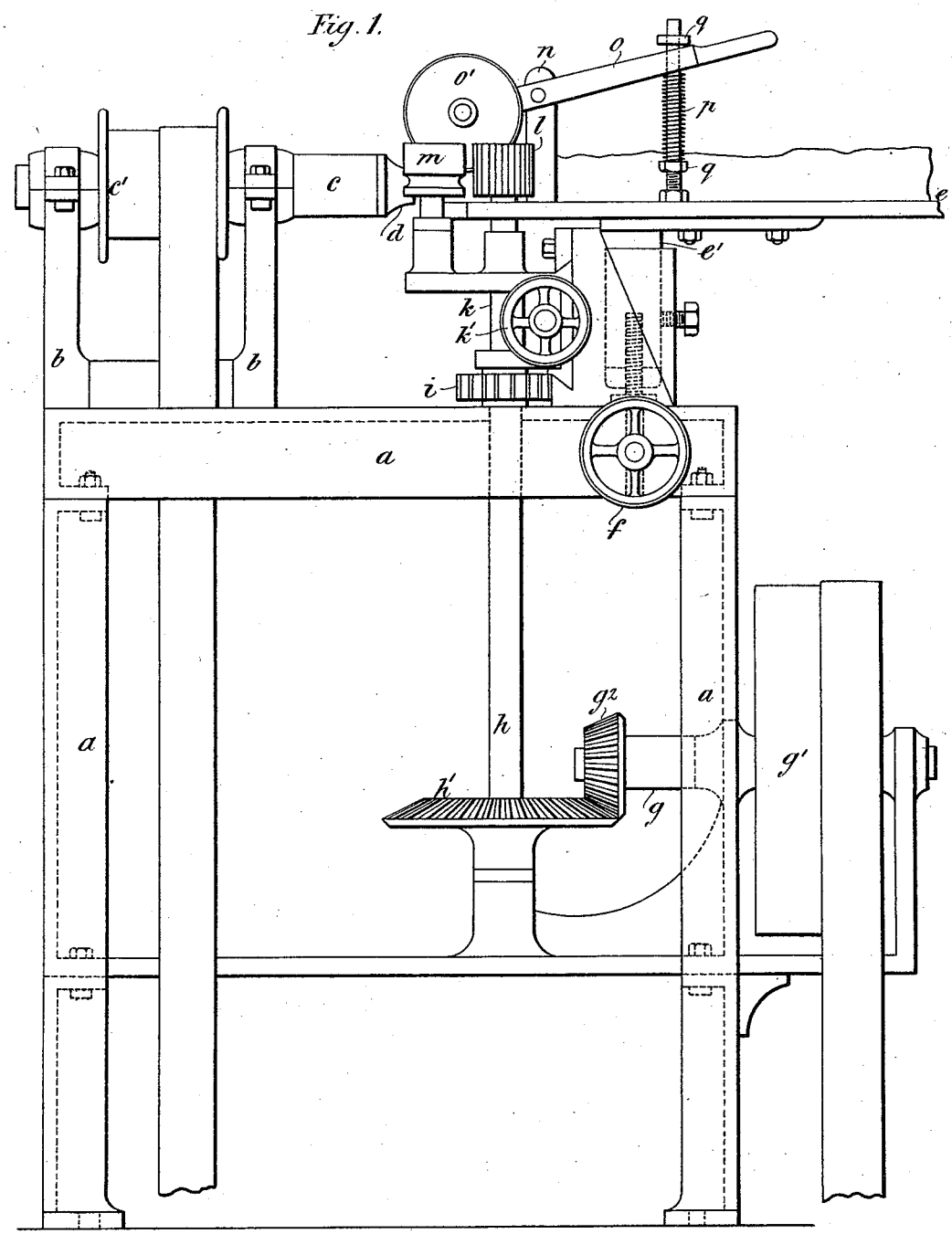
Figure 2:
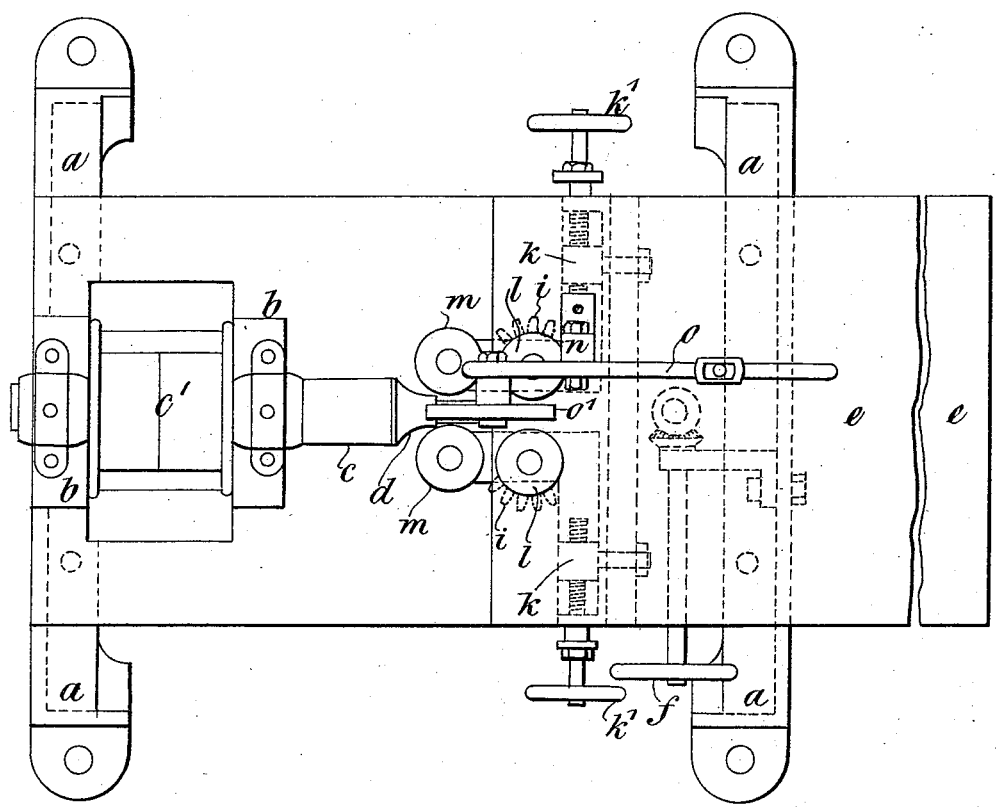

Figure 1 is a side elevation of the machine for cutting or shaping corks. Fig. 2 is a plan of the machine.

$a$ is the frame of the machine. It supports the head stock $b$ in which is the spindle $c$. It is driven at high velocity by a belt passing around the pulley $c'$. The spindle $c$ is hollow and it carries the tubular cutter $d$ which presents an annular cutting edge and has a conical or tapered exterior in rear of the cutting edge. The frame also carries the stem $e'$ on the top of which the table $e$ is fixed. The stem $e'$ is held in suitable guides and by the screw and nut it can be raised and lowered; the screw being geared by beveled pinions with the axis of the hand wheel $f$. The frame also carries the axis $g$ on which are fast and loose pulleys $g'$ and the beveled pinion $g^2$. This pinion drives a wheel $h'$ on the vertical axis $h$ and this carries a spur wheel $i$. The teeth of the wheel $i$ are long and are engaged with the teeth of another similar wheel $i'$. The axes of the wheels $i$ and $i'$ are carried by slides $k$ $k$ which are movable along horizontal guides on the frame.

$k'$ $k'$ are hand wheels for setting the slides which they do by means of screws and nuts and the slides when set can be locked fast. $l$ and $l$ are rollers which are fast upon the axes of the wheels $i$ and $i'$. The slides $k$ also carry the rollers $m$ $m$ which can revolve freely upon stud axes.

$n$ is a standard fixed to the frame and serving as a fulcrum for the lever $o$. This lever carries at one end an axis on which is the roller $o'$ and the other end of the lever is controlled by the spring $p$. The spring is coiled around a stem on which are nuts $q$. One of these serves as a stop for the lever and another to adjust the compression of the spring.

The operation of the machine is as follows: The parts having been suitably adjusted and set in movement, rectangular bars of cork previously cut to a suitable size are brought to the machine. The bars are placed on the table $e$ and one at a time the ends of the bars of cork are presented to the rollers $l$ $l$. These rollers carry the bar onward toward the cutter $d$ the top roller $o'$ keeping the bar down and the rollers $m$ $m$ guiding it truly. As soon as one bar is passed on from between the rollers $l$ $l$ another bar is presented to them. The cutter reduces the bars of cork to a circular section but leaving flats on two sides as is usual in cork cutting. The bars in this form are delivered out at the rear end of the hollow spindle $c$. The division of the circular bars into lengths suitable for use is a separate operation.

It will be observed that the cutter $d$, has a cylindrical passage through it, and an annular cutting edge, and that on the exterior it is tapered or coned. This tapered or inclined surface around the cutting edge serves to break off the waste pieces at the corners of the square bars of cork which are passed through the cutter. The feed-wheels $l, l'$ are positively driven, while the guide-wheels $m, m'$ are not driven, but are free to rotate. By this arrangement, when working with an easily yielding body, such as cork, much truer work can be obtained than would be possible if driven feed-rollers alone were used, for the work is effectually guided and yet, before it reaches the cutter, it has time to recover from the severe nip of the feed-rollers necessary to crowd the cork forward.

The feed and guide rollers are mounted in pairs, a feed and a guide roller on the same slide, and the slides can be accurately set by hand wheels and screws which traverse the slides along guides provided upon the frame. There is hence no trouble in adjusting the feed-rollers for they go with the guide-rollers, and if the guide-rollers are properly set the feed-rollers must necessarily be in place. By arranging the table $e$, as shown and described, the cork may be made to advance to the cutter in a direction parallel with the axis of rotation. The table is carried by a stem $e'$, which is adjustable up and down in guides by means of a hand-wheel and screw, the table being adjusted independently of the guide and feed-rollers.

By employing a top roller $o'$, pressing on the top of the cork, and rising and falling to allow inequalities to pass beneath it, the under side of the bar of cork is kept in contact with the table which serves as a guide for it, while it is simultaneously guided on the two sides by the guide-rollers.

What I claim is—

1. In a machine for cutting or shaping corks, the combination of the cutter with an annular cutting edge and a smooth, conical or tapered exterior, a hollow rotating shaft carrying at its end the said cutter, a vertically adjustable feed table, feed rollers over the table and positively driven to feed a bar of cork to the cutter, freely revolving guide rollers overlapping the edge of the cutter interposed between the feed rollers and the end of the cutter mounted on vertical pivots on opposite sides of the cutter to act upon opposite sides of the bar of cork fed between them.

2. In a machine for cutting or shaping corks, the combination of a rapidly rotating hollow shaft armed at its end with an annular cutter having a smooth conical or tapered exterior, freely rotating guide rollers set in proximity to the cutter, overlapping the edge thereof and mounted on vertical pivots on opposite sides of the axial line of the cutter, means for adjusting the rollers toward and from each other, a pair of feed rollers mounted on vertical pivots, means for positively driving the feed rollers to feed a bar of cork through the guide rollers to the cutter, and means for rotating the cutter.

3. In a machine for cutting or shaping corks, the combination consisting of a rapidly rotating hollow shaft and cutter, with guide rollers and feed rollers in front of the cutter presenting the cork to it and a pair of slides carrying the rollers; each such slide carrying one freely rotating guide-roller and one driven feed-roller so that they both may be simultaneously adjusted to their proper working positions by the movement of the slide in its guides.

4. The combination of the cutter having an annular cutting edge, means for revolving it, the freely revolving guide rollers mounted on vertical pivots on opposite sides of the cutting edge, the positively driven feed rollers mounted on vertical pivots on opposite sides of the axial line of the cutter, a vertically adjustable table beneath the guide rollers and feed rollers, and a pressure roller $O'$ arranged above the table and between the guide rollers and feed rollers.

JOHN LOWMAN.

Witnesses:
E. OLUÊÜ,
Commercial Clerk, 61 Waterport Street.
J. W. TOGGIO,
Banker's Clerk at Mr. A. S. Jullian, Gibraltar.